June 28, 1960 F. G. VON KUMMER ET AL 2,943,312
DATA TRANSLATING UNITS
Filed Oct. 30, 1957
3 Sheets-Sheet 1
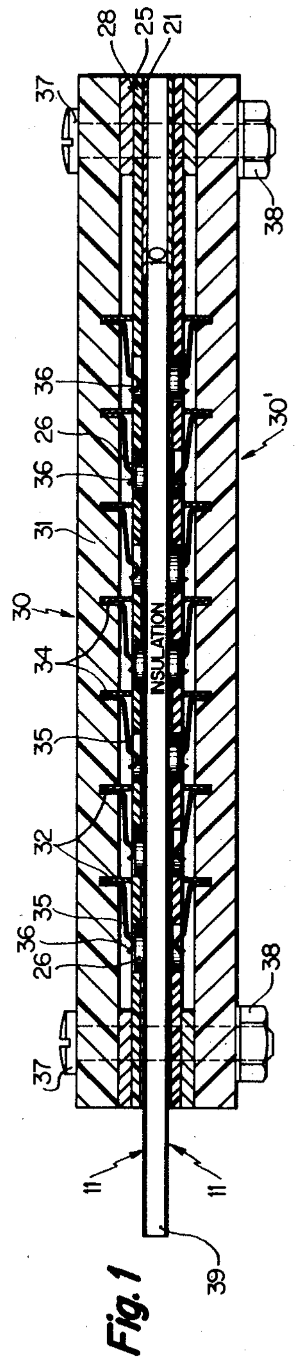
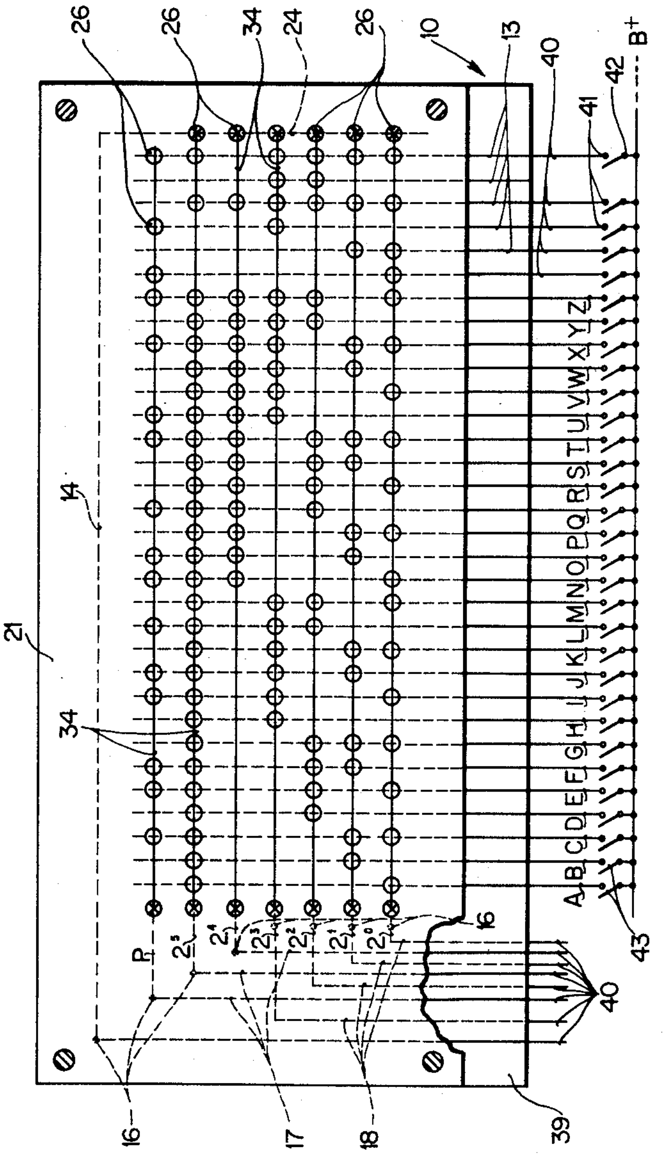
Fig.2
Fig.4
INVENTORS
FERDINAND G. von KUMMER
FRANK M. GALLAGHER
BY Thomas S. Ross
Joseph P. Spalla
ATTORNEYS June 28, 1960 F. G. VON KUMMER ET AL 2,943,312

DATA TRANSLATING UNITS

Filed Oct. 30, 1957 3 Sheets-Sheet 2

INVENTORS
FERDINAND G. von KUMMER
FRANK M. GALLAGHER
BY Thomas S. Ross
Joseph R. Spalla
ATTORNEYS INVENTORS
FERDINAND G. von KUMMER
FRANK M. GALLAGHER
BY Thomas S. Ross
Joseph P. Spalla
ATTORNEYS United States Patent Office 2,943,312

Patented June 28, 1960

2,943,312

DATA TRANSLATING UNITS

Ferdinand G. von Kummer, Bloomfield, and Frank M. Gallagher, Bristol, Conn., assignors to Royal McBee Corporation, Port Chester, N.Y., a corporation of New York Filed Oct. 30, 1957, Ser. No. 693,284

10 Claims. (Cl. 340—347)

This invention relates to a data translating unit incorporating printed circuits; more particularly it relates to a data translating unit construction employing a master printed circuit in combination with rectifiers; and wherein perforate masks selected in accordance with desired codes determine the placement of the rectifiers on the printed circuit.

Data translating units in present use are not only uneconomical with respect to cost and more important space, but require personnel trained in data processing machine language to assemble them. Furthermore, the data translating units now in use are not flexible in that the components thereof are usually tailor made for a particular code configuration. In other words, if a different code configuration is needed a completely new unit must be provided.

In the instant invention a small, compact, rugged and durable unit composed of simple interchangeable components is provided, and the components are so constructed that assembly of the unit is facilitated by persons unfamiliar with data processing machine language. The construction incorporates a master printed circuit card in combination with disk rectifiers; the rectifiers being placed on the printed circuits in selected positions to direct the flow of current in paths whereby energization of printed output circuitry is accomplished in accordance with a desired coding arrangement. In accordance with the invention the selected positions on which the rectifiers are to be placed are determined by placing a perforate mask or matrix over the master printed circuit card. The rectifiers then may simply be dropped into the holes in the matrix by any unskilled worker. As will be apparent where different code configurations are required it is only necessary to use a different matrix with the same master printed circuit card and a rearrangement of the rectifiers. A further feature of the invention resides in the fact that the rectifiers are held in pressure contact with the printed circuit by universal comb springs which serve to carry signals between the printed circuit input and output lines.

Data translating units of the above mentioned type are adapted for use in many applications but they are particularly suited for use within the limited framework of a business machine, such as a typewriter, whereby information printed by the machine may be simultaneously converted into data processing machine language.

An object of the invention therefor is to provide a small, compact and inexpensively manufactured data translating unit.

Another object of the invention is the provision of a data translating unit constructed with interchangeable components whereby its logic is easily varied as desired.

Still another object of the invention is the provision of a data translating unit employing a master printed circuit, disk rectifiers, and perforate matrices for determining where the rectifiers are to be placed on the printed circuit for a desired code configuration whereby the assembly of the unit is facilitated.

A further object of the invention is the provision of comb spring connectors for selectively coupling, in combination with disk rectifiers, printed circuit input and output conductors and for retaining said rectifiers in contact with the printed circuit conductors through spring pressure.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 1 is a cross sectional view of an encoder card unit constructed in accordance with the invention;

Fig. 2 is a view of an assembled unit with parts broken away and circuits schematically shown connected to switches adapted to be actuated by a business machine;

Fig. 4 is a legend showing the symbols employed to show directions of current flow through disk rectifiers.

Figure 3:
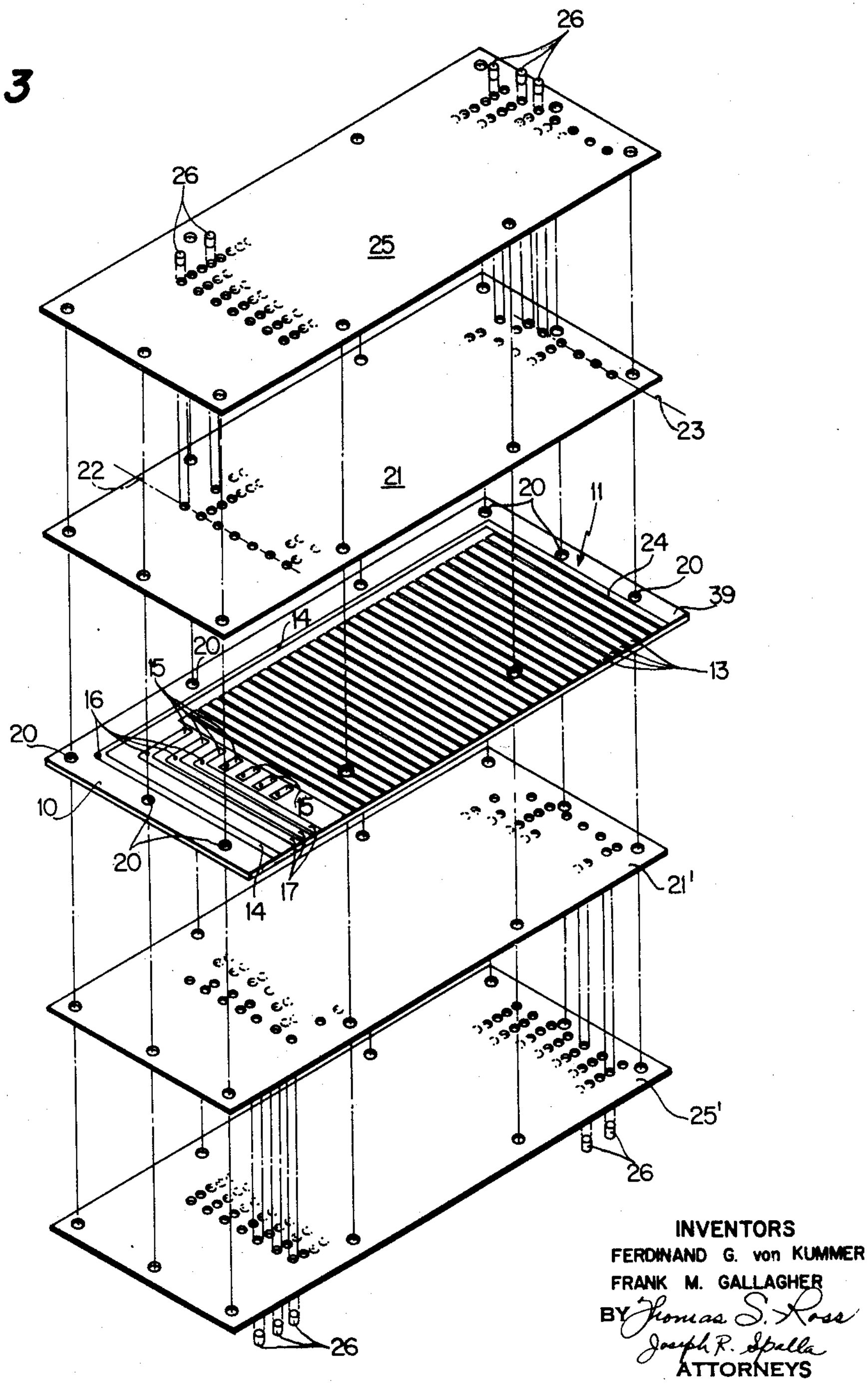
Fig. 3 is an exploded perspective view illustrating the method of assembly of the components of Fig. 1.

Referring now to the drawings wherein is illustrated a specific embodiment of the invention and wherein like reference characters designate like or corresponding parts throughout the several views there is shown in the figures a card 10 of suitable insulating material, each side of which has a conductive pattern, generally designated by reference character 11, deposited thereon in accordance with well known techniques forming printed circuit conductors.

The master printed circuit patterns in the specific embodiment are adapted to encode up to 64 bits of information into a six level code. To enable a compact unit each side of the card is provided in the present showing with thirty two input conductors 13; the conductors 13 on the upper side of the card being superimposed over those on the lower side. As seen in Fig. 3 the conductors 13 are transverse to the long dimension of the rectangular card and spaced from one another. Each side of the card also has a common output conductor 14; the conductor 14 on the upper side being superimposed over the conductor 14 on the lower side. As will hereinafter appear the conductors 14 will be energized upon energization of any one of the input conductors on either side of the card. Each side of the card is also provided with seven coded output conductor sections 15 (Fig. 3) parallel with the long dimension of the card. As seen in Fig. 2 the sections 15 represent a check or parity level P and six binary levels $2^5$, $2^4$, $2^3$, $2^2$, $2^1$ and $2^0$ respectively. Corresponding level sections on each side of the card are electrically connected as by rivets secured in holes 16 in the printed circuit board as are the conductors 14 in a similar manner. As seen in Figs. 2 and 3, the check or parity level P, the $2^5$ and $2^4$ level sections 15 are staggered on the upper side of the printed circuit card whereby printed output conductors 17 integral therewith and transverse to the long dimension of the card may be brought out to the edge of the upper side of the card. The $2^3$, $2^2$, $2^1$ and $2^0$ level sections 15 on the lower side as schematically shown in Fig. 2 are staggered whereby output conductors 18 integral therewith and transverse to the long dimension of the card may be brought out to the edge of the lower side of the card. As is apparent then, a common and seven coded output conductors are brought to the edge of the printed circuit card.

Figure 5:
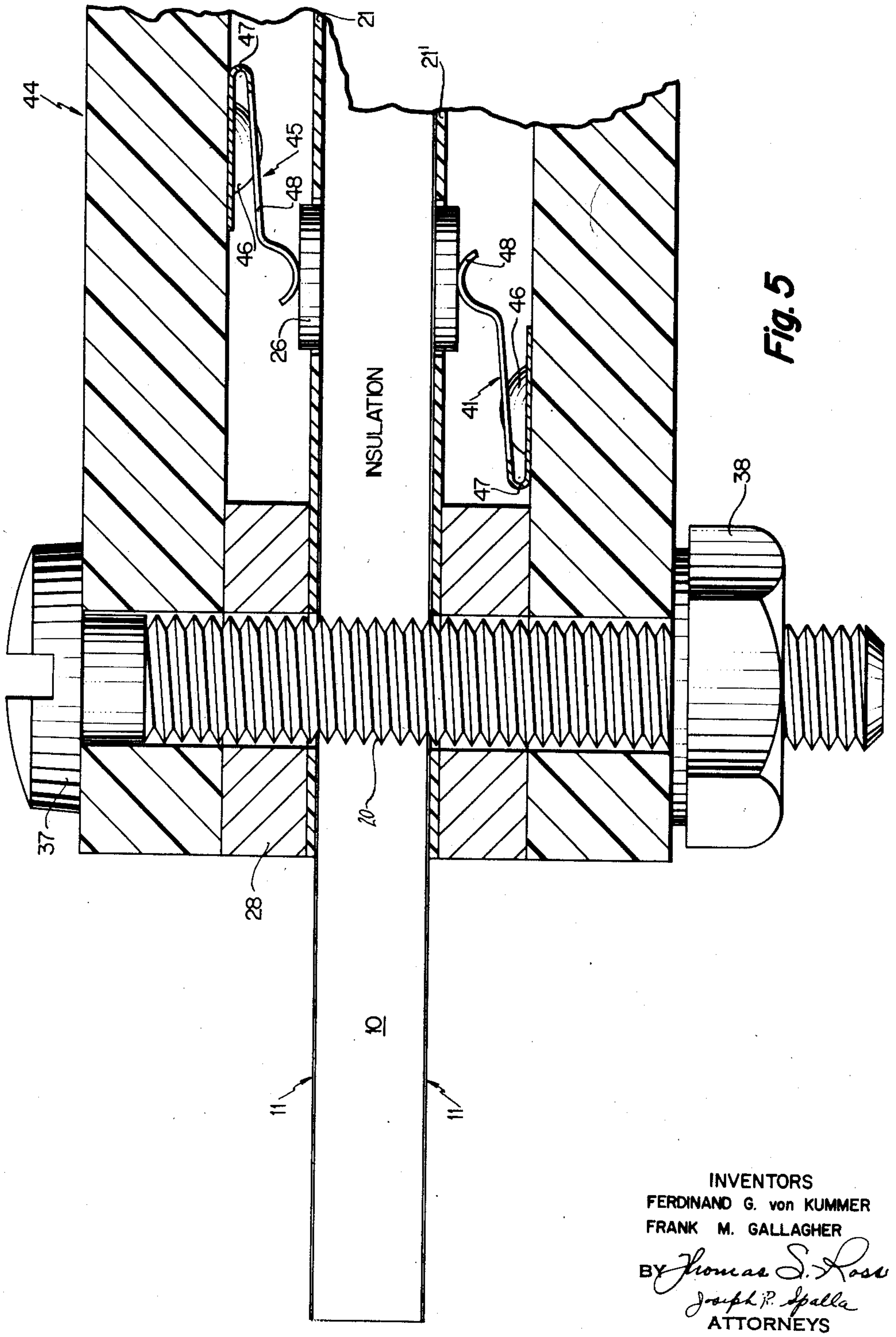
Fig. 5 is a fragmentary cross sectional view of a modification of the invention.

Assembly of a unit is accomplished by placing the printed circuit card 10 on a fixture plate (not shown) which is provided with a plurality of vertically disposed aligning pins adapted to be received by a sufficient number of marginal holes 20 in the printed circuit card, which are threaded as seen in Fig. 5. A mask 21 of suitable insulating material, provided with unthreaded marginal holes adapted to receive the aligning pins, is placed over the printed circuit card. The mask is preforated in accordance with any desired code e.g. a six level Baudot code with a check or parity level P. As is apparent the mask will have 32 columnar hole combinations punched therein; the number and level of the holes in each column being in accordance with the chosen six level code. The perforate mask is placed over the printed circuit card with the 32 columnar hole combinations over the 32 input conductors 13 on the card. The perforate mask is also provided with two additional columns 22 and 23 of seven and six holes respectively, the latter column as seen in Fig. 2 being disposed over the portion 24 of the output conductor 14 transverse to the long dimension of the card and to the right of the 32 input conductors. As schematically shown in Fig. 2 upon placement of the mask over the printed circuit card only those parts of the printed circuit input conductors 13 beneath the holes in each columnar combinations of holes will be exposed.

Next in the order of assembly is a grid spacer 25 of suitable insulating material provided with a hole in every position i.e. 7 levels x 34 columns and a plurality of unthreaded marginal holes adapted to receive the aligning pins. The grid spacer is placed over the perforate mask with its columns of holes in alignment with the columnar hole combinations of the perforate mask. In accordance with the specific embodiment of the invention the grid spacer is adapted, as will hereinafter become apparent, to provide a retaining well for disk rectifiers which are to be received in the holes of the perforate mask. It is to be understood however, that the grid spacer is not essential to the unit as is apparent from Fig. 5 which shows a unit without the grid spacer.

Next in the order of assembly are disk rectifiers 26 preferably of the selenium type. The symbolic legend shown in Fig. 4 is herein adopted to designate the direction of current flow through the rectifiers. The disk rectifiers 26 are dropped into holes in the grid spacer corresponding with holes in the perforate mask whereby they are in contact with the printed circuit conductors in accordance with the code punched in the perforate mask. As seen in Fig. 2 the rectifiers 26 in contact with the input conductors 13 conduct current in an upward direction and those rectifiers 26 in contact with the portion 24 of output conductor 14 and the seven coded output conductor sections 15 conduct current in a downward direction.

Next in the order of assembly is a rectangular frame like spacer 28 (Fig. 1) formed of any suitable material which is also provided with a plurality of unthreaded marginal holes adapted to receive the aligning pins.

A cover assembly, generally indicated by reference character 30 also provided with unthreaded marginal holes adapted to receive the aligning pins is next placed over the spacer. The cover assembly in the embodiment of Fig. 1 comprises a plate 31 provided with a plurality of grooves 32 extending parallel to its long dimension; one for each of the seven coded output levels. Each groove is adapted to receive and anchor the universal portion of a thirty four toothed comb spring 34 formed from any suitable conductive material. As seen in Fig. 1 the teeth 35 on each comb spring normally depend downwardly from a horizontal plane and are provided with rounded semi-circular ends 36 adapted to engage and spring bias the disk rectifiers 26 in tight electrical engagement with the printed circuit conductors. As seen in Fig. 1 those teeth of the comb springs not in contact with a rectifier occupy the well formed by the holes in the grid spacer.

After assembling the upper perforate mask, upper grid spacer, rectifiers and upper cover assembly on the fixture they are secured together by bolts 37 threaded into unused marginal holes of the printed circuit card. Thereafter the so secured upper assembly is lifted from the fixture and turned bottom or lower side up; the bolts 37 threaded into the upper assembly now serving as aligning pins whereby the lower perforate mask 21', lower grid spacer 25', rectifiers and lower plate assembly 30' may be placed over the lower side of the printed circuit card in the manner described and secured to the upper assembly by nuts 38 threaded on ends of the bolts.

Where desired, a suitable cement may be placed on the sides of the perforate masks facing the printed circuit card, between the perforate mask and grid spacer, and on either side of spacers 28 during assembly to provide a more rigid unit.

The completed unit as shown in section in Fig. 1 and schematically in Fig. 2 may be mounted by any suitable means within the framework of a typewriter or like business machine. As is apparent from Figs. 1 and 2 the printed circuit card is relatively wider than the other components of the unit. This relatively wider portion 39 to which the printed conductors extend may be plugged into a suitable connector whereby the terminals of external leads 40 may be connected to all the input and output printed circuit conductors. All of the input leads 40 connected to the printed circuit conductors 13 on either side of the printed circuit card are each adapted to be connected to one terminal 41 of a switch whose other terminal 42 is connected to a power supply. The movable arms 43 of the switches are each adapted to be closed in response to the actuation of key controlled mechanisms in a business machine whereby an associated printed circuit input conductor 13 is energized. Actuation of the switch representative of an A for example, will energize the A printed circuit conductor. Current will flow up through the rectifiers 26 on the A printed circuit conductor which are disposed on levels corresponding to the $2^0$ and $2^5$ level and into associated comb springs 34. The current will split in the comb springs, part flowing through those rectifiers 26 in contact with associated coded output level sections 15 representing the $2^0$ and $2^5$ levels, to output conductor 17 and 18 associated therewith and to leads 40 connected thereto. The other part will flow through rectifiers 26 associated with levels $2^0$ and $2^5$ in contact with portion 24 of output conductors 14 whereby a signal will be delivered to the output lead 40 connected to conductor 14. The latter output lead is adapted to energize the solenoid of an electromagnetically operated clutch whereby a tape will be fed in synchronism with punches electromagnetically selected in response to coded output signals on leads 40 associated with the seven output levels.

As will be apparent from an inspection of the code in Fig. 2, whenever a code column representing a character or information bit has an odd number of holes, a hole is provided in the check level so that every character will be represented by an even number of holes. If then an odd number of holes is punched in the tape being perforated it will indicate an error.

In accordance with the invention the unit may be modified as shown in Fig. 5 by providing a modified cover assembly 44 having comb springs 45 with the configuration shown. In this modification the comb springs 45 are secured to the cover plates by screws 46 or the like threaded into the cover plates thereby securing the universal portions 47 between the teeth 48 of the comb springs, to the cover plates thereby to provide a more positive anchor. As seen in the Fig. 5 assembly, the anchor portions 47 of the comb springs on the upper and lower cover plates associated with the corresponding levels are alternately arranged, with the teeth thereof extending toward their associated level. As is apparent this arrangement permits interchangeability of the cover plate assemblies.

It will be realized from the foregoing that the instant invention provides an economical means of encoding, which permits of a small compact easily assembled unit. Any variation of coding may be derived simply by changing perforate masks.

It should be understood therefor, that the foregoing disclosure relates to only a preferred embodiment of the invention and that it is intended to cover all changes and modifications of the example of the invention herein chosen for the purposes of the disclosure, which do not constitute departures from the spirit and scope of the invention.

The invention claimed is:

1. A translator comprising a master printed circuit card wherein the conductive pattern comprises a plurality of isolated columnar and row conductors, disk rectifiers disposed on each of said columnar conductors at predetermined row levels in accordance with a desired coding arrangement, a disk rectifier disposed on each of said isolated row conductors, and means for connecting said rectifiers on row conductors with rectifiers on columnar conductors in associated row levels.

2. A translator unit as recited in claim 1 further comprising a perforated mask on said printed circuit card, the placement of said rectifiers on said columnar conductors being determined by the perforation pattern of said mask.

3. An encoder comprising a printed circuit card having a plurality of isolated parallel conductors, a plurality of isolated conductors perpendicular to said parallel conductors, said parallel conductors being adapted to be individually energized by signals representative of data to be encoded, said perpendicular conductors being representative of successive code orders, disk rectifiers contacting each of said parallel conductors at levels coextensive with the level of said perpendicular conductors in accordance with a desired code arrangement, a disk rectifier contacting each of said isolated perpendicular conductors, and means for connecting said rectifiers on perpendicular conductors with rectifiers on parallel conductors on levels coextensive with said perpendicular conductors, said rectifiers being poled to direct the flow of current from said parallel conductors to predetermined ones of said perpendicular conductors.

4. A data translating unit construction comprising a rectangular master printed circuit card having a plurality of isolated conductors arranged in columns transverse to the long dimension of said card and in a row parallel to the long dimension of said card, a plurality of rectifiers adapted to be placed on said printed circuit conductors in selected positions thereby to direct the flow of current from said columnar conductors to predetermined ones of said row conductors in accordance with a desired coding arrangement, perforate means for determining the selected positions on which said rectifiers are to be placed, and means for connecting columnar conductors to row conductors through rectifiers in common row levels.

5. A data translating unit construction as recited in claim 4 wherein said perforate means comprises a card of insulating material perforated in accordance with a desired code arrangement, said card being adapted to be placed over said printed circuit card whereby only portions of said printed circuit conductors coincident with holes in said card are exposed.

6. A data translating unit as recited in claim 4 wherein said last named means comprises a plurality of conductive comb springs and a cover plate for supporting said comb springs, the teeth of each of said comb springs connecting all the rectifiers in a common row level, whereby each of said columnar conductors are selectively connected to one or more of said row conductors.

7. A device adapted to encode information into data processing machine language wherein said information is represented by columns of perforations in and transverse to the direction of movement of a tape, the number and level of holes in a column being in accordance with a desired code, said device comprising a plurality of printed input circuits each representing a bit of information to be encoded and each adapted to be individually energized, rectifiers disposed on each of said printed input circuits at predetermined levels in accordance with a coding arrangement having a plurality of levels, said rectifiers being poled to conduct current away from said printed circuits, a plurality of printed output circuits one corresponding to each level of said code, a rectifier on each of said output circuits poled to conduct toward said output circuits, and means for connecting each of the rectifiers on said printed output circuits with rectifiers on printed input circuits in associated levels.

8. An encoder unit construction for encoding a plurality of bits of information into coded columnar hole combinations, the number of levels in said coded combinations depending on the number of bits of information to be encoded, said unit comprising a plurality of printed input circuits each representing a bit of information to be encoded and each adapted to be individually energized, a plurality of printed output circuits one corresponding to each of the levels in a chosen code, a plurality of rectifiers adapted to be placed over each of said printed input circuits in selected code levels, said rectifiers being poled to conduct away from said input circuits, a rectifier on each of said printed output circuits poled to conduct toward said output circuits, and means for connecting said last named rectifiers with rectifiers on printed input circuits in corresponding code levels, whereby upon energization of said input circuits selected ones of said output circuits are energized.

9. A compact sandwich type encoder unit construction adapted to convert information into a binary code, the number of orders in said code depending on the number of bits of information to be encoded, said unit comprising a printed circuit card having a master conductive pattern on either side, said patterns having a plurality of columnar conductors each representative of a bit of information to be encoded and each adapted to be individually energized, and a plurality of row conductors representative of successive binary orders, masks perforated in accordance with a predetermined code arrangement adapted to be secured to either side of said printed circuit card, rectifiers, said perforations being adapted to receive said rectifiers whereby said rectifiers are in contact with said columnar conductors on lines coextensive with said row conductors and in contact with each of said row conductors, cover plate assemblies, means adapted to secure said plate assemblies, perforate masks, and printed circuit card, and conductive means on said cover plate assembly for connecting rectifiers on said columnar conductors on lines coextensive with said row conductors with the rectifiers on said coextensive row conductors.

10. An encoder assembly comprising a printed circuit card having first isolated conductors and second isolated conductors, said first conductors each representing a bit of information to be encoded and each adapted to be individually energized, said second conductors representing successive binary levels, means for directing the flow of current from each of said first conductors to predetermined ones of said second conductors in accordance with a predetermined code, said means comprising first rectifiers disposed in alignment with predetermined binary levels on said first conductors, the number of said first rectifiers being in accordance with the code representation of the bit of information represented by an associated first conductor, said first rectifiers being poled to conduct any from said first conductors, second rectifiers disposed on said second conductors poled to conduct toward said second conductors, and means connecting said first and second rectifiers in common binary levels.

References Cited in the file of this patent

UNITED STATES PATENTS

| | | |
|---|---|---|
| 2,019,625 | O'Brien | Nov. 5, 1935 |
| 2,066,876 | Carpenter et al. | Jan. 5, 1937 |
| 2,215,667 | Sherman | Sept. 24, 1940 |
| 2,502,291 | Taylor | Mar. 28, 1950 |
| 2,871,549 | Arnold | Feb. 3, 1959 |